US011585308B2

(12) United States Patent
Arnot

(10) Patent No.: US 11,585,308 B2
(45) Date of Patent: Feb. 21, 2023

(54) APPARATUS AND METHOD FOR RETROFIT ENGINE START/STOP AND IDLE CONTROL

(71) Applicant: THERMEX ENGINEERED SYSTEMS INC., Abbotsford (CA)

(72) Inventor: Roger Arnot, Abbotsford (CA)

( * ) Notice: Subject to any disclaimer, the term of this patent is extended or adjusted under 35 U.S.C. 154(b) by 0 days.

(21) Appl. No.: 17/106,006

(22) Filed: Nov. 27, 2020

(65) Prior Publication Data

US 2021/0095629 A1 Apr. 1, 2021

Related U.S. Application Data

(63) Continuation of application No. 15/642,879, filed on Jul. 6, 2017, now abandoned.

(60) Provisional application No. 62/359,158, filed on Jul. 6, 2016.

(51) Int. Cl.
| | |
|---|---|
| *F02N 11/08* | (2006.01) |
| *B60W 30/18* | (2012.01) |
| *F02D 45/00* | (2006.01) |
| *B60W 10/06* | (2006.01) |
| *B60W 20/15* | (2016.01) |
| *F02N 11/10* | (2006.01) |

(52) U.S. Cl.
CPC ......... *F02N 11/0829* (2013.01); *B60W 10/06* (2013.01); *B60W 20/15* (2016.01); *B60W 30/18018* (2013.01); *F02D 45/00* (2013.01); *F02N 11/108* (2013.01); *B60W 2510/0642* (2013.01); *B60Y 2304/076* (2013.01); *F02N 11/0803* (2013.01); *F02N 11/0814* (2013.01); *F02N 2200/022* (2013.01); *F02N 2200/023* (2013.01); *F02N 2200/063* (2013.01); *F02N 2200/122* (2013.01)

(58) Field of Classification Search
CPC ............ F02N 11/0814; F02N 11/0829; F02N 2200/023; F02N 2200/122; B60W 20/15; B60W 20/16; B60W 30/18018
See application file for complete search history.

(56) References Cited

U.S. PATENT DOCUMENTS

| | | | | |
|---|---|---|---|---|
| 4,421,075 | A * | 12/1983 | Mandel ............... | F02N 11/0848 123/142.5 R |
| 8,739,751 | B2 * | 6/2014 | Stoffels ............... | F02N 11/0818 123/179.14 |
| 2010/0131152 | A1* | 5/2010 | Castonguay ....... | B60H 1/00885 701/112 |
| 2011/0017164 | A1* | 1/2011 | Larson ................. | F02P 23/045 123/179.31 |

(Continued)

*Primary Examiner* — Sizo B Vilakazi
*Assistant Examiner* — Anthony L Bacon
(74) *Attorney, Agent, or Firm* — Palmer IP Inc.

(57) ABSTRACT

A system and method for retrofit engine start/stop control system for an air starter equipped internal combustion engine includes a circuit to energize and air control value, an air pressure sensor, a programmable logic controller, an engine block temperature sensor to measure an external engine temperature, an ambient temperature sensor, an ignition circuit connector, a battery voltage sensor, and an engine speed sensor. The programmable logic controller is configured to start the engine when at least one of the pressure of the compressed gas tank, an external engine block temperature, an ambient air temperature, and a battery output voltage fall below a predefined threshold value for startup.

16 Claims, 6 Drawing Sheets

(56) References Cited

U.S. PATENT DOCUMENTS

| | | | |
|---|---|---|---|
| 2012/0018240 A1* | 1/2012 | Grubaugh | B62D 51/02 |
| | | | 701/70 |
| 2013/0158838 A1* | 6/2013 | Yorke | B60W 10/06 |
| | | | 701/123 |
| 2013/0231848 A1* | 9/2013 | Roberts | B60W 30/18018 |
| | | | 701/112 |
| 2014/0277973 A1* | 9/2014 | Nedorezov | B60R 25/00 |
| | | | 701/53 |
| 2015/0183435 A1* | 7/2015 | Johnson | F02N 11/0803 |
| | | | 701/112 |
| 2015/0210289 A1* | 7/2015 | Eichin | B60W 50/0205 |
| | | | 701/49 |
| 2017/0122150 A1* | 5/2017 | Sutton | F02N 11/0829 |
| 2017/0305234 A1* | 10/2017 | Krofchalk | F02D 29/02 |

* cited by examiner

APPARATUS AND METHOD FOR RETROFIT ENGINE START/STOP AND IDLE CONTROL

REFERENCE TO PENDING APPLICATIONS

This application claims the benefit of U.S. patent application Ser. No. 15/642,879 entitled Apparatus and Method for Retrofit Engine Starts/Stop and Idle Control, filed Jul. 6, 2017, which claims benefit of U.S. Patent Provisional Application, Ser. No. 62/359,158 entitled Apparatus and Method for Retrofit Engine Starts/Stop and Idle Control, filed Jul. 6, 2016.

1. TECHNICAL FIELD

The present invention relates generally to an apparatus and method for retrofit engine start/stop and idle control. More specifically, the present invention relates to an apparatus and method for providing retrofit programmable engine start/stop control and idle control for existing internal combustion engines.

2. BACKGROUND

Unnecessary idling of internal combustion engines in vehicles and heavy equipment produces undesired carbon and other polluting emissions, consumes additional unnecessary fuel, increases wear and maintenance requirements on engines and ancillary equipment, contributes to idle-specific engine problems such as fouling and "wet-stacking" due to low engine and/or exhaust idle temperatures, and reduces available up-time between required maintenance intervals. Each of these disadvantages represent efficiency, environmental and financial costs to the operator of the vehicle and/or equipment. Particularly in industries where vehicles and equipment are used intermittently or on an on-demand basis, long periods of idling have typically been associated with the operational duty-cycle of the internal combustion engines powering the equipment. These disadvantages of idling are further compounded in harsh cold weather environments, where engines are typically also idled to maintain operating temperatures during cold weather.

Certain engine start/stop systems have been provided in the art attempting to integrate start/stop functions into OEM engine control unit (ECU) systems, which have typically required customized development to attempt integration with closed-source and proprietary engine control systems, leading to increased costs and complexity of start/stop functionality, and risks of warranty cancellation or obsolescence due to engine manufacturing or maintenance updates. Other start/stop engine control systems in the art require substantial mechanical modifications and invasive alterations to engines and vehicle systems in order to function, which may undesirably increase costs and complexity as well as risk reliability and warranty coverage for expensive engines and vehicle or equipment components.

Therefore, there remains a need for an apparatus and method providing for start/stop and idle control functionality for internal combustion engine powered vehicles and equipment. More particularly, a need exists for systems and methods to provide for retrofit start/stop and idle control functionality for existing vehicle and equipment engines.

3. SUMMARY

It is an object of the present invention to provide an apparatus and method for providing retrofit engine start/stop and idle control functions that addresses some of the limitations of the prior art.

According to an embodiment of the invention, a retrofit engine start/stop control system is provided which comprises: a programmable logic controller comprising computer executable instructions to control stop and start function of an internal combustion engine; an engine block temperature sensor operable to directly measure an external temperature of an internal combustion engine block; an ambient air temperature sensor operable to measure the ambient air temperature outside an engine compartment; an ignition circuit connector operable to initiate an ignition circuit of an internal combustion engine to initiate starting of the engine; and a battery voltage sensor operable to measure the output voltage of an alternator and/or starter battery for the engine; and an engine speed sensor operable to measure the rotational speed of the engine (RPM); wherein, the computer executable instructions comprise instructions to initiate starting of the internal combustion engine when at least one of an external engine block temperature, an ambient air temperature and a battery output voltage fall below a predefined threshold value for startup.

According to another embodiment, the programmable logic controller of the retrofit engine start/stop control system additionally comprises computer executable instructions to initiate shutdown of the internal combustion engine when one or more of an external engine block temperature, an ambient air temperature and a battery output voltage rise above a predefined threshold value for shutdown.

According to a further embodiment, the programmable logic controller of the retrofit engine start/stop control system additionally comprises a data storage medium which is operable to periodically record system status information, including one or more of an external engine block temperature, an ambient air temperature, a battery output voltage, and an engine speed. In an optional such embodiment, the data storage medium may also be removable such as for transferring system status information for analysis, troubleshooting and/or archive purposes.

In another embodiment, a method for retrofit engine start/stop idle control is provided, comprising: activating a programmable logic controller adapted for controlling stop and start and idle control functions of a running internal combustion engine; measuring an engine block temperature, ambient temperature, and battery system voltage; determining if all of the monitored engine block temperature, ambient temperature, and battery system voltage values exceed corresponding predetermined threshold values for shutdown; and controlling the engine to continue running if any of the monitored values do not exceed a predetermined threshold value, and controlling the engine to shut down if all of the monitored values exceed corresponding predetermined threshold values for shutdown.

In yet a further embodiment, a method for retrofit engine start/stop idle control is provided, comprising: measuring an engine block temperature, ambient temperature, and battery system voltage for an internal combustion engine that is not running; determining if any of the monitored engine block temperature, ambient temperature, and battery system voltage values fall below corresponding predetermined threshold values for startup; and continuing to measure the engine block temperature, ambient temperature and battery system voltage if all monitored values remain above corresponding predetermined threshold values for startup, and controlling the engine to start up if any of the monitored values fall below a predetermined threshold value for startup.

Further advantages of the invention will become apparent when considering the drawings in conjunction with the detailed description.

4. BRIEF DESCRIPTION OF THE DRAWINGS

The system and method of the present invention will now be described with reference to the accompanying drawing figures, in which.

Like reference numerals refer to corresponding parts throughout the several views of the drawings.

5. DETAILED DESCRIPTION OF SEVERAL EMBODIMENTS

Figure 1:
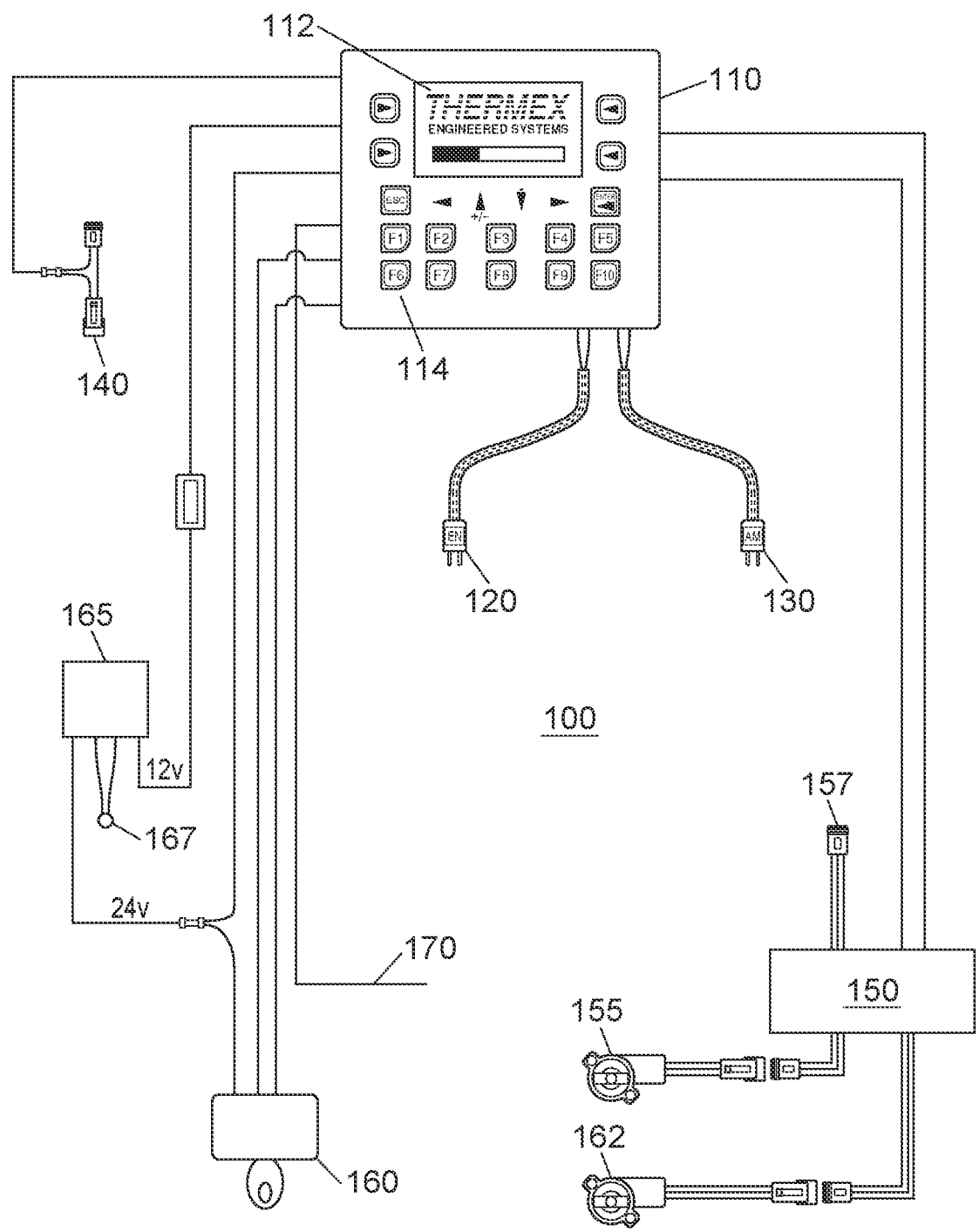
FIG. 1 illustrates a schematic diagram of a retrofit engine start/stop and idle control system according to an embodiment of the present invention.

With reference to FIG. 1, a schematic diagram of a retrofit engine start/stop and idle control system 100 is shown, according to an embodiment of the present invention. In one such embodiment, the engine control system 100 is adapted for retrofit installation to an existing internal combustion engine, to provide for programmable start/stop and idle control of the internal combustion engine. One area of application for this type of retrofit start/stop engine control is for installation in existing off-highway (also known as off road) or on-highway (also known as road) vehicles powered by an internal combustion engine, so as to provide for enhanced start/stop and idle control functionality of the internal combustion engine in the vehicle. In a particular embodiment, a retrofit engine start/stop and idle control system 100 may be particularly useful in vehicles which are subject to intermittent or on-call use, but which may typically previously left to idle or remain running for lengthy periods during operation. One example of such an application is for providing retrofit start/stop and idle control for internal combustion engines in heavy-duty machinery, such as off-highway trucks, haul trucks, construction equipment, generators, welders, light tower gensets and other heavy duty equipment powered by internal combustion engines, such as to desirably provide for reduced idle time and associated fuel consumption and engine wear/maintenance requirements, while still providing for easy startup and hot-start availability of such equipment when needed.

In one such embodiment, the retrofit start/stop and engine idle control system 100 may be installed on any suitable internal combustion engine, including diesel, gasoline, propane, CNG (compressed natural gas), alternative fuel (e.g. biogas, methanol or ethanol fueled, for example) powered internal combustion engines, and vehicles powered by such internal combustion engines, for example. In such a manner, the retrofit installation of a start/stop and engine idle control system 100 to an existing internal combustion engine may desirably provide for enhanced functionality and efficiency of operation over the duty cycle of the associated vehicle or other equipment powered by the internal combustion engine.

In one embodiment, the retrofit start/stop and engine idle control system 100 comprises a programmable logic controller (PLC) 110, which comprises a processor and stores computer-executable instructions to implement the start/stop and idle control functionality of the system 100 for controlling the operation of an internal combustion engine. In one embodiment, the PLC 110 comprises a data storage medium (not shown) which is operable to periodically record system status information, such as an internal or removable data storage medium which may comprise one or more of an internal or removable memory card, chip, or other suitable memory storage medium, and may further optionally comprise a telematics module (not shown), such as a wireless or other suitable telematics interface to provide for transmission of system data and/or control signals for interfacing with the PLC 110 of the retrofit start/stop and engine idle control system 100, for example. In an optional such embodiment, the data storage medium may also be removable such as for transferring system status information for analysis, troubleshooting and/or archive purposes.

In one aspect, system 100 also comprises an engine block temperature sensor 120, an ambient air temperature sensor 130, an engine speed sensor 140, which are each communicably connected to PLC 110 to enable the PLC 110 to interface with each sensor and measure engine block temperature, ambient air temperature, and engine speed (or engine RPM which may be used such as to determine engine running status and/or idle speed for example) as one or more monitored conditions for determining control of an internal combustion engine. The PLC 110 is also communicably connected to the engine electrical system 165 such as the engine starter battery or alternator, the engine ignition switch 160 and an ignition electrical connection 170 to the engine control unit (ECU) (not shown) of an internal combustion engine, such that the PLC 110 may be operably connected to interface with the engine electrical system 165, ignition switch 160 and ECU ignition connection 170 so as to enable measurement of an output voltage of the electrical system 165, and to detect the position of the ignition switch 160 operated by an operator of the internal combustion engine powered vehicle or equipment, and to send and/or receive signals from the ignition connection of the internal combustion engine ECU 170, for example. The PLC 110 and/or the engine electrical system 165 may also be connected directly to an engine ground connection 167, such as the engine block, for example, so as to provide an electrical ground reference for the system 100.

In one embodiment, the PLC 110 is also operably connected to a fast idle switch 150, such as to provide for control of idle rate or idle engine speed between a low or normal engine idle speed and a fast engine idle speed during operation of the start/stop control system 100. In one such embodiment, the PLC 110 may be operable to activate the fast idle switch 150 such as to advance the engine throttle to a fast idle position and increase the engine idle speed to a fast idle when desired, such as during an engine run cycle following automatic startup by the start/stop system 100 when it is desired to increase the engine block temperature of the engine towards an upper predetermined engine block temperature at which the engine may be shut down, for example, or to enable a fast idle speed to desirably reduce and/or avoid potential undesired engine conditions associated with protracted low engine idle speed and low engine idle temperatures such as incomplete combustion, engine or exhaust system fouling or "wet stacking" which may present particular problems during idle periods in cold weather with low ambient temperatures, for example. In a particular embodiment, the fast idle switch 150 may be operably connected to a fast idle throttle position sensor 162 which is operable to detect the throttle position of the internal combustion engine during fast idle. In one aspect, the fast idle switch 150 may also be operably connected to a pedal or accelerator throttle position sensor (TPS) 155 associated with the internal combustion engine throttle to detect the position of the engine throttle during normal engine operation, and optionally a further pedal throttle position sensor connector 157 operable to connect the fast idle switch 150 to an accelerator pedal position sensor (not shown) and to detect the position of the accelerator pedal during operation of a vehicle powered by the internal combustion engine, for example.

In one embodiment, the engine block temperature sensor 120 of system 100 may desirably be adapted for direct retrofit connection to an exterior surface of the engine block of an internal combustion engine and to detect the temperature of the engine block directly at the exterior surface of the engine block. In such an embodiment, the engine block temperature sensor 120 may desirably provide for easy connection of the engine block temperature sensor 120 to an existing internal combustion engine, such as by securing the engine block temperature sensor 120 under any suitable bolt or other attachment directly connected to the engine block of the internal combustion engine. In such a manner, the direct external connection of the engine block temperature sensor 120 may desirably avoid invasive or other potentially complex, expensive, or leak or damage prone methods of detecting engine temperature such as may require tapping into an internal fluid (such as coolant or oil) loop of the internal combustion engine, for example. In one such embodiment, the engine block temperature sensor 120 of system 100 may desirably provide for a non-invasive attachment to the outer surface of the internal combustion engine block and direct detection and monitoring of the external engine block surface temperature, for use in controlling the start/stop and idle control of the engine by PLC 110, for example. In one exemplary embodiment, engine block temperature sensor 120 may comprise a thermocouple or other suitable temperature sensor means, adapted for attachment to the outside of the engine block such as under the head of a bolt secured in the engine block, for example.

In one embodiment, the ambient temperature sensor 130 of system 100 may comprise any suitable temperature sensing device, such as a thermocouple for example, which is adapted to detect and monitor the outside ambient air temperature. In one embodiment adapted to start/stop control of a vehicle internal combustion engine, the ambient temperature sensor 130 may desirably be adapted for easy attachment to the vehicle so as to measure the ambient air temperature of the environment around the vehicle. In one aspect, the ambient air temperature sensor 130 may desirably be mounted on the vehicle in a location where any influence on the temperature of the internal combustion engine is desirably reduced or avoided, so as to reduce interference with accurate detection of the ambient air temperature. In such a manner, in one aspect the ambient outside temperature may be read from sensor 130 by PLC 110 and may be used to determine criteria for control of start/stop and idle control of the internal combustion engine, for example. In one such embodiment, the ambient temperature determined by sensor 130 may be used by PLC 110 to determine the engine block temperature upper and lower thresholds for triggering start/stop of the engine. In another such embodiment, the ambient temperature determined by sensor 130 may be used by the PLC 110 to trigger between two or more preset temperature modes for controlling start/stop of the engine, such as switchover between winter/summer modes for example. In a further embodiment, changes in the ambient temperature determined by sensor 130 may be used by the PLC 110 such as to proactively anticipate or modify start/stop parameters for adapting to changing outside temperatures such as to change one or more of start/stop temperature thresholds, engine idle speeds or other parameters controlled by start/stop system 100 to desirably provide for improved engine operation parameters in response to changes in ambient temperature, for example.

In a particular embodiment, PLC 110 may optionally comprise one or more display elements 112 such as to display operational or diagnostic information associated with the operation of the system 100, such as for use during installation, maintenance, setup, calibration, adjustment or operation of the PLC 110 and the start/stop engine control system 100. PLC 110 may also be adapted for wired, wireless or other suitable communication with one or more external computers or electronic devices such as to provide for communication with and optionally control of PLC 110 if desired from a connected such device, as may be desirably for setup, maintenance, troubleshooting, monitoring or analysis of operation of the PLC 110 and system 100, for example. In one aspect, PLC 110 may also comprise one or more buttons, switches or other user operable controls 114, such as may assist with operation or maintenance of the PLC 110 and system 100. As may be understood in the art, any suitable PLC system such as commercially available programmable systems capable of the herein described features and connections may be adapted or implemented to provide the functionality of PLC 110, for example.

Additionally, in one embodiment, use of an independent standalone PLC 110 in system 100 may desirably provide for the control and monitoring features of the start/stop and idle control system 100 without requiring control integration and/or reprogramming of the OEM engine control unit (ECU) of an internal combustion engine, which may desirably provide for simplified retrofit installation, setup, and adjustment of the features of system 100 with an existing internal combustion engine. Such retrofit connection of system 100 and PLC 110 to an existing internal combustion engine without the requirement for control integration and interface with the OEM ECU may further desirably avoid unnecessary reprogramming or alteration of the OEM ECU, which may potentially endanger warranty coverage or reliability of the OEM ECU and internal combustion engine systems, for example. The retrofit standalone connection of system 100 and standalone PLC 110 to an existing internal combustion engine may also desirably provide for wider compatibility of the system 100 for use with a wide range of existing internal combustion engines which may incorporate many different ECU configurations and communication protocols, which may be problematic for providing compatibility of an integrated ECU interface in other approaches implemented in certain integrated systems known in the art, for example.

Figure 2:
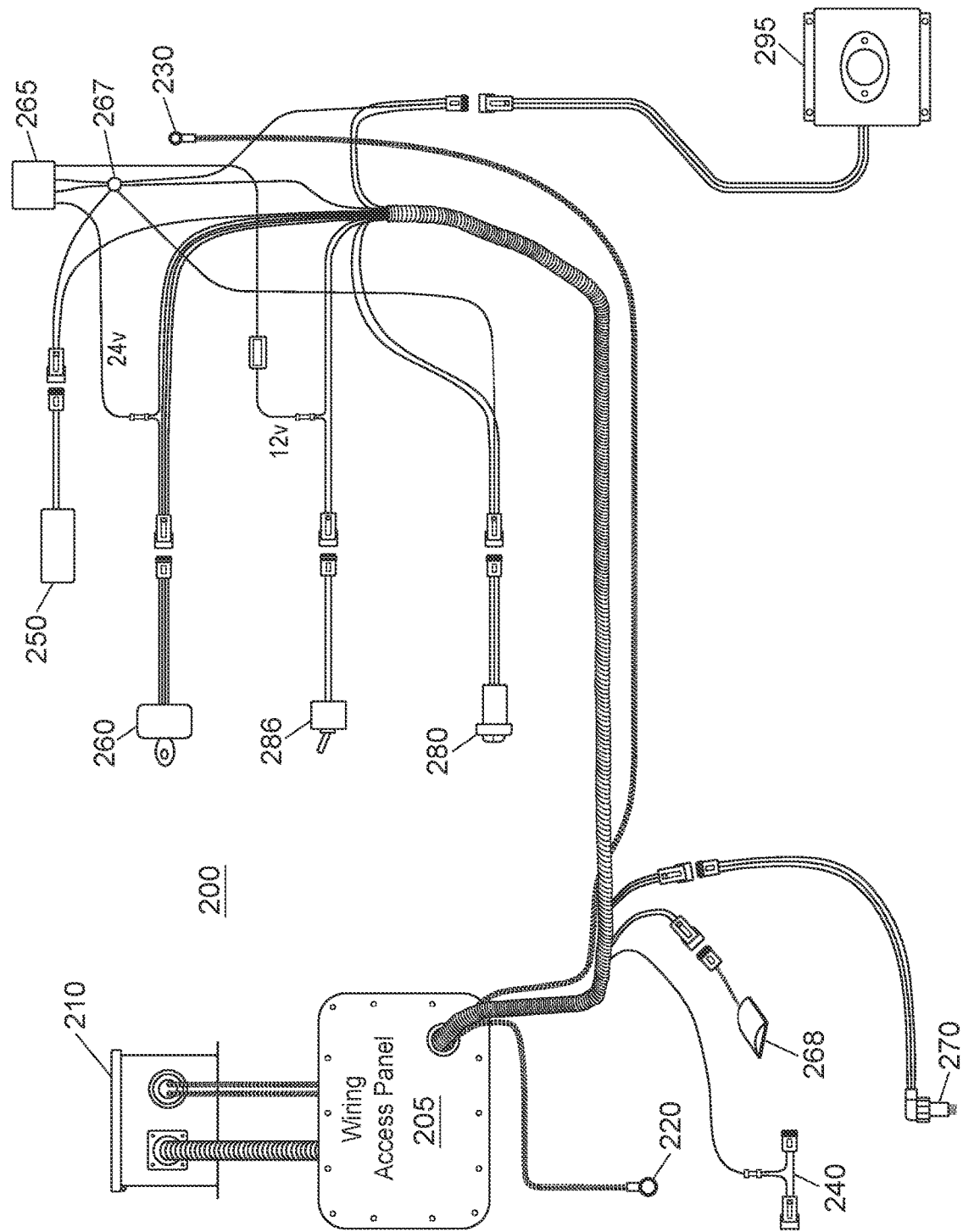
FIG. 2 illustrates a schematic diagram of a retrofit engine start/stop and idle control system connected to engine control components of an exemplary internal combustion engine vehicle, according to an embodiment of the invention.

Referring to FIG. 2, a schematic diagram of a retrofit engine start/stop and idle control system 200 connected to engine control components of an exemplary internal combustion engine vehicle (not shown) is shown, according to an embodiment of the invention. Similar to as shown in FIG. 1 above, in one such embodiment, the engine control system 200 is adapted for retrofit installation to an existing internal combustion engine, to provide for programmable start/stop and idle control of the internal combustion engine. As described above, an area of application for this type of retrofit start/stop engine control is for installation in existing off-highway (also known as off road) or on-highway (also known as road) vehicles powered by a diesel, gasoline, CNG, or alternative fuel powered internal combustion engine, so as to provide for enhanced start/stop and idle control functionality of the internal combustion engine in the vehicle. In a particular embodiment, a retrofit engine start/stop and idle control system 200 may be particularly useful in vehicles which are subject to intermittent or on-call use, but which may typically previously left to idle or remain running for lengthy periods during operation, such as in heavy-duty machinery, and in particular for off-highway trucks, haul trucks, construction equipment, generators, welders, light tower gensets and other heavy duty equipment powered by internal combustion engines, such as to desirably provide for reduced idle time and associated fuel consumption and engine wear/maintenance requirements, while still providing for easy startup and hot-start availability of such equipment when needed.

In one embodiment, the retrofit start/stop and engine idle control system 200 comprises a programmable logic controller (PLC) 210, which comprises a processor and stores computer-executable instructions to implement the start/stop and idle control functionality of the system 200 for controlling the operation of an internal combustion engine. Similar to as described in reference to FIG. 1 above, in one embodiment, the PLC 210 comprises a data storage medium (not shown) which is operable to periodically record system status information, such as an internal or removable data storage medium which may comprise one or more of an internal or removable memory card, chip, or other suitable memory storage medium, and may further optionally comprise a telematics module (not shown), such as a wireless or other suitable telematics interface to provide for transmission of system data and/or control signals for interfacing with the PLC 210 of the retrofit start/stop and engine idle control system 200, for example.

In one aspect, PLC 210 may be communicably connected to other components of the system 200 through a wiring access panel 205 or other access location in a vehicle to provide for access to system and control wiring routes for connection to components of the internal combustion engine of the vehicle, for example. In one such embodiment, system 200 also comprises a directly externally mounted engine block temperature sensor 220, an ambient air temperature sensor 230, and an engine speed sensor 240, which are each communicably connected to PLC 210 such as through a vehicle wiring access panel 205, to enable the PLC 210 to interface with each sensor and measure engine block surface temperature, ambient air temperature, and engine speed (or engine RPM, which may be used such as to determine engine running status and/or idle speed for example) as one or more monitored conditions for determining control of the vehicle's internal combustion engine. The PLC 210 is also communicably connected to the engine electrical system 265 such as the engine starter battery or alternator, the engine ignition switch 260 so as to enable measurement of an output voltage of the electrical system 265, and to detect the position of the ignition switch 260 operated by an operator of the vehicle or piece of equipment. The PLC 210 and/or the engine electrical system 265 may also be connected directly to an engine ground connection 267, such as the engine block, for example, so as to provide an electrical ground reference for the system 200.

In one embodiment, similar to as described above in reference to FIG. 1, the PLC 210 is also operably connected to a fast idle switch 250, such as to provide for control of idle rate or idle engine speed between a low or normal engine idle speed and a fast engine idle speed during operation of the start/stop control system 200. In one such embodiment, the PLC 210 may be operable to activate the fast idle switch 250 such as to advance the engine throttle to a fast idle position and increase the engine idle speed to a fast idle when desired, such as during an engine run cycle following automatic startup by the start/stop system 200 when it is desired to increase the engine block temperature of the engine towards an upper predetermined engine block temperature at which the engine may be shut down, for example, or to enable a fast idle speed to desirably reduce and/or avoid potential undesired engine conditions associated with protracted low engine idle speed and low engine idle temperatures such as incomplete combustion, engine or exhaust system fouling or "wet stacking" which may present particular problems during idle periods in cold weather with low ambient temperatures, for example.

In one aspect, PLC 210 may also be operably connected to a start/stop system switch 285, which may be operable by a vehicle driver or equipment operator to activate or deactivate (i.e. turn ON or OFF) the start/stop and idle control system 200. System 200 may also comprise at least one visual indicator such as an LED or other suitable indicator light 280 which may be operably attached to the PLC 210 and installed in a location visible to the driver/operator of a vehicle or equipment, such as to provide visual indication of the operation status of the start/stop and idle control system 200. In a further aspect, a second indicator or warning device such as an audible indicator siren or speaker 295 may also be provided and operably connected to PLC 210, such as to provide for a further indication, such as an audible warning or siren which may alert a driver or operator of the vehicle or equipment.

In one such embodiment, the indicator light 280 may indicate operational status of the system 200 such as by providing a steady or blinking colored light (such as green or red, for example) to indicate one or more operational states of system 200, such as to inform a user or equipment operator of the status of the start/stop system 200. In one exemplary embodiment, upon initial activation of the start/stop system 200, a first visual indication may be provided to a user by indicator 280, such as a flashing green light, for example. Upon verification of a ready status of the system 200, a second visual indication may be provided, such as a steady green light, for example. While waiting for engagement of the start/stop system 200 such as by an operator turning off an ignition switch for example, the system 200 may provide a third visual indicator, such as a flashing orange light and/or an audible indication such as a warble, or blip from speaker or siren 295, for example, indicating that an engine shutdown sequence may be commenced by the system 200. In yet a further embodiment, upon initiation of a startup sequence by the system 200, one or more of a visible light indication (such as a flashing red or other color or strobe light for example) or an audible signal such as a siren or alarm signal may be provided. In another embodiment, an error or safety lockout warning signal may also be provided by one or more of visible (such as flashing red light 280) or audible (such as through siren or alarm speaker 295) may be provided to a driver or operator by PLC 210, for example.

In one embodiment, system 200 may also comprise a hood or access panel switch or sensor 268, operably connected to PLC 210, such as to indicate if a hood, access panel or other access opening in a vehicle or piece of equipment is opened, and may provide for halting operation of the system 200 or providing a warning or error status indication to a driver or user, to notify of the open access, for example. In one such embodiment, the activation of a hood or access switch or sensor 268, such as may indicate maintenance on or tampering with the engine or system 200, may desirably cause the PLC 210 to discontinue or lock out the start/stop and idle control system 200 until an authorized user or technician can reset operation of the system 200, such as by entry of an authorization code or password in communication with the PLC 210, for example.

In a further embodiment adapted for installation on a vehicle using an air pressure activated engine start system, such as large diesel powered haul trucks, for example, system 200 may comprise an air start pressure sensor 270 operably connected to PLC 210. This system may be configured to be used on an air-starter equipped combustion engine, such as those used to provide initial rotation to large diesel and gas turbine engines, including air-start mining machines. In one such embodiment, air start pressure sensor 270 may desirably provide for measurement and monitoring of the pressure of a compressed air tank (or other compressed gas, if used) as a monitored condition used for determining engine startup and shutdown requirements by PLC 210. In one such embodiment, the pressure of an air restart tank may be monitored with respect to a predetermined minimum air pressure to reliably provide for restart of an air-started internal combustion engine (such as 100 psi for example) or the buildup of air pressure during a run cycle to a predetermined higher air pressure threshold allowing for shutdown of a vehicle engine (such as 125 psi for example). Air compressor systems on large mining machines are notorious for ongoing development of multiple small leaks which, overnight, can deplete the pressure of an air start tank to below effective starting pressure (such as 100 psi, for example). It is a common and costly practice for mines to have a compressor equipped service truck on standby for dispatch to assist startup of air depleted machines at the start of a shift in the event of such a leak or leaks. Thus, the system may be configured to start the engine when the pressure falls below a particular threshold for startup. Similarly, the system may be configured to later shut down the engine if the pressure falls below a second threshold for shut down. In one aspect, the system may include an ignition circuit connector which can energize a circuit which enables an air control valve, which then uses compressed air to start the engine. For example, the air control valve may be connected to a compressed gas tank and when the air control valve is released, this may allow the compressed gas, such as compressed air, to initiate the starting of the air-starter equipped combustion engine.

In one aspect, the retrofit engine start/stop and idle control system may include a variety of safety features. These features may increase the safety of both the system and a vehicle to which the system is implemented. These features may help the system comply with safety laws and regulations, such as those from local municipal governments, state governments, administrative agencies, and other bodies. These features may also go above and beyond any safety systems provided by machine OEMs and/or requirements and standards set by outside bodies to enhance the safety of the system and of a vehicle equipped with the system. These features may be implemented on, for example, large mining equipment.

For example, the system may be configured to sense a combination of (1) engagement of the parking brake and (2) an operator being present, and may use this information to determine when to shut down and/or start up the engine. The system may be configured with a parking brake engagement sensor, which relays to the system when the parking brake is engaged and when the parking brake is disengaged. For example, the parking brake engagement sensor may take the form of a hydraulic pressure sensor. The system may also be configured with an operator presence detection system, such as detecting the weight of the operator on the seat, detect whether a seat belt is done up, detect the motion of the operator within a cabin, or using other sensors to detect the presence of the operator of a vehicle or piece of equipment. The system may be configured with logic to shut down the engine, or to start up the engine, based on a combination of these two variables. In one aspect, for example, the system may be configured to immediately shut down the engine if sensors determine that (1) the parking brake is not set, and that (2) the operator has left the cab of the vehicle. This may increase the safety of the vehicle by preventing accidents that could potentially occur because of the running engine without either an operator or the parking brake engaged. This may also reduce the wear and tear on the equipment, from running less often when not in use, and may reduce running costs of the equipment from running less frequently and consuming less fuel. In another aspect, for example, the system may be configured to shut down the engine after a timed interval when (1) the operator leaves the cab and (2) the parking brake is set. Thus, the system may be operable to shut down the engine, or to use a timed interval to shut down the engine, when the operator exits the cab of the vehicle. The timed interval used may be selected by a user, such as allowing a user to select a timed interval between, e.g., 30 seconds to 20 minutes. The selection between immediate shutdown and timed shut-down may be made based on whether a parking brake of the vehicle has been engaged.

In one aspect, the system may be configured to alter the timing of an engine shutdown based on the cooldown or one or more turbochargers. For example, turbochargers on an engine may require a given period of time to cool down after use, such as cooling using fans or other mechanisms driven by the engine. It may be potentially harmful to these devices to shut down the system prior to a given period of time, allowing the turbochargers to cool down. The system may be configured to adjust its shut-down sequences based on these cool-down times. In one aspect, these cool-down times may be set by the owner of a piece of equipment based on the needs of that equipment, such as selecting cool-down times between 30 seconds to 20 minutes, or perhaps cool-down times of 3 to 4 minutes. For example, the system may be programmed with a time delay function or timer that relates to a cool-down time of the turbochargers. This timer may be set based on the use of the turbochargers, set to a fixed period of time, or set in other ways. The system may also be equipped with one or more temperature sensors and may be configured to only shut down the engine when below a threshold temperature. For example, the system may sense the temperature of the exhaust and may prevent shut down until the exhaust temperature is below a threshold temperature. This threshold temperature may be selected for a given engine based on the safe operating limits of a particular engine to ensure that the turbocharger is not damaged by shutting down the engine too early. Using either of these methods, or other methods, the system may be configured to avoid shutting down the engine based on determining whether it would damage the turbocharger to shut down the engine. This turbocharger-based logic may be used in conjunction with any of the other systems described herein, to prevent damage to the turbocharger from the premature stopping of the engine. The system may further include an emergency stop button, which may allow a user to shut down the engine or to otherwise override the time delay function and/or temperature sensor. As the name suggest, the emergency stop button may be used in case of emergency, when it is essential that the engine shut down despite whether it may damage the turbocharger or not.

The system may also include remote access capabilities which allow for real-time data monitoring of live data from the vehicle/engine. For example, the system may be connected to the Internet, such as using Wi-Fi, cellular connections, or wired internet connections, and may be accessible remotely using the internet or using an internal intranet. The system can therefore allow real-time data monitoring of the data received from any of its sensors, including data such as ambient air temperature, block temperature, battery voltages, air pressure of a compressed gas tank, oil pressure, hydraulic fluid level, fuel level, fuel flow, start/stop/runtime events, operator present detection, park brake engagement, transmission lockout engagement, exhaust temperature, GPS position, accelerometer, output voltage, rotational speed of the engine, and an external temperature of the engine. This data may be acquired by the system and monitored in a non-invasive manner. This data monitoring system may be completely independent of other data monitoring systems which may be included on some vehicles and vehicle components, such as the J1939 protocol and data system.

These remote access capabilities may also offer other features, in additional to real-time data monitoring. For example, an administrator may be able to both monitor data in real time, such as over the internet or an intranet, and may be able to control or partially control the operation of the system from a remote location. The system may be configured to receive instructions from a properly-authenticated remote user, such as allowing a remote user to enable or disable autonomous starting of the engine, allowing a remote user to force the shut-down of the engine, and allowing a remote user to adjust the operation of the system remotely, including changing parameter set points and other data which affects the operation of the system. Thus, the remote access capabilities may allow an administrator to both monitor and control the operation of the system remotely.

Similar to as described above in reference to FIG. 1, in one embodiment, the engine block temperature sensor 220 of system 200 may desirably be adapted for direct retrofit connection to an exterior surface of the engine block of an internal combustion engine and to detect the temperature of the engine block directly at the exterior surface of the engine block. In such an embodiment, the engine block temperature sensor 220 may desirably provide for easy connection of the engine block temperature sensor 220 to an existing internal combustion engine, such as by securing the engine block temperature sensor 220 under any suitable bolt or other attachment directly connected to the engine block of the internal combustion engine. In such a manner, the direct external connection of the engine block temperature sensor 220 may desirably avoid invasive or other potentially complex, expensive, or leak or damage prone methods of detecting engine temperature such as may require tapping into an internal fluid (such as coolant or oil) loop of the internal combustion engine, for example. In one such embodiment, the engine block temperature sensor 220 of system 200 may desirably provide for a non-invasive attachment to the outer surface of the internal combustion engine block and direct detection and monitoring of the external engine block surface temperature, for use in controlling the start/stop and idle control of the engine by PLC 110, for example. In one exemplary embodiment, engine block temperature sensor 220 may comprise a thermocouple or other suitable temperature sensor means, adapted for attachment to the outside of the engine block such as under the head of a bolt secured in the engine block, for example.

In one embodiment, the ambient temperature sensor 230 of system 200 may comprise any suitable temperature sensing device, such as a thermocouple for example, which is adapted to detect and monitor the outside ambient air temperature. In one embodiment adapted to start/stop control of a vehicle internal combustion engine, the ambient temperature sensor 230 may desirably be adapted for easy attachment to the vehicle so as to measure the ambient air temperature of the environment around the vehicle. In such a manner, in one aspect the ambient outside temperature may be read from sensor 230 by PLC 210 and may be used to determine criteria for control of start/stop and idle control of the internal combustion engine, for example. In one such embodiment, the ambient temperature determined by sensor 230 may be used by PLC 210 to determine the engine block temperature upper and lower thresholds for triggering start/stop of the engine. In another such embodiment, the ambient temperature determined by sensor 230 may be used by the PLC 210 to trigger between two or more preset temperature modes for controlling start/stop of the engine, such as switchover between winter/summer modes for example. In a further embodiment, changes in the ambient temperature determined by sensor 230 may be used by the PLC 210 such as to proactively anticipate or modify start/stop parameters for adapting to changing outside temperatures such as to change one or more of start/stop temperature thresholds, engine idle speeds or other parameters controlled by start/stop system 200 to desirably provide for improved engine operation parameters in response to changes in ambient temperature, for example.

In a further optional embodiment, system 200 may additionally comprise an optional coolant heater (not shown) communicably connected to PLC 210, such that operation of the coolant heater may be controlled by the PLC, such as in response to one or more of the measured block temperature, ambient air temperature and battery system voltage, for example. In one such embodiment, the optional coolant heater may be powered by one or more of a fuel-fired heater and electrical power such as from the battery system. In a particular optional embodiment, the PLC 210 may activate the coolant heater in response to a first measured temperature of the engine block and/or ambient air, which may be prior to a threshold temperature at which the PLC 201 may initiate restart of the engine, such as to provide an initial heating or preheating of the engine prior to or in place of a requirement to restart the engine to maintain a desired threshold engine block temperature or battery system voltage, for example.

Similar to as described above in reference to FIG. 1, in one embodiment, use of an independent standalone PLC 210 in system 200 may desirably provide for the control and monitoring features of the start/stop and idle control system 100 without requiring control integration and/or reprogramming of the OEM engine control unit (ECU) of an internal combustion engine, which may desirably provide for simplified retrofit installation, setup, and adjustment of the features of system 200 with an existing internal combustion engine in an existing vehicle or piece of equipment. Such retrofit connection of system 200 and PLC 210 to an existing internal combustion engine without the requirement for control integration and interface with the OEM ECU may further desirably avoid unnecessary reprogramming or alteration of the OEM ECU, which may potentially endanger warranty coverage or reliability of the OEM ECU and internal combustion engine systems, which may be particularly important for use in heavy duty applications, for example. As may be understood in the art, any suitable PLC system such as commercially available programmable systems capable of the herein described features and connections may be adapted or implemented to provide the functionality of PLC 210, for example.

Figure 3:
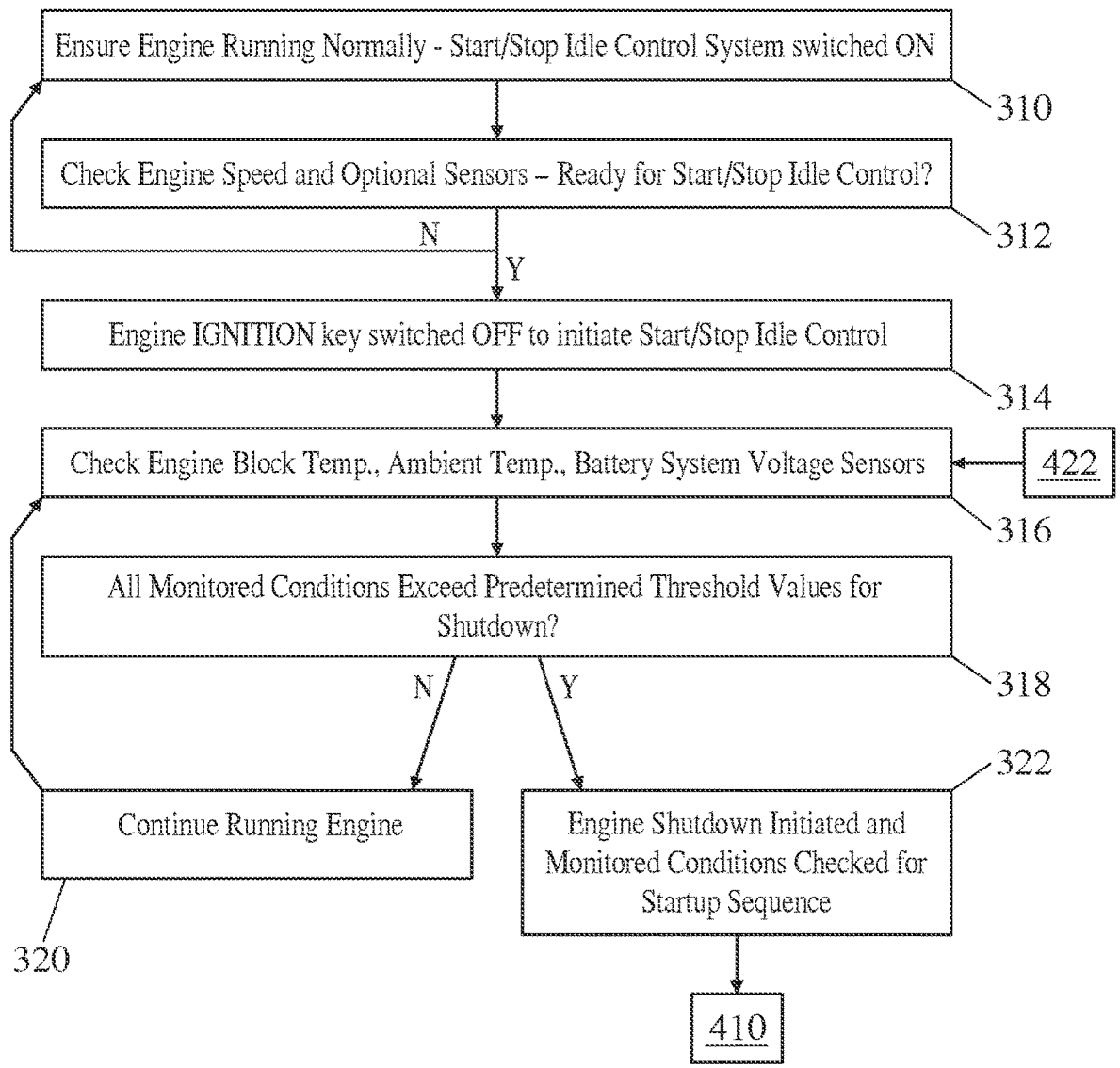
FIG. 3 illustrates an exemplary sequence of operations associated with a method of start/stop engine control, according to an embodiment of the invention.

With reference to FIG. 3, an exemplary sequence of operations associated with a method of start/stop engine control is shown, according to an embodiment of the present invention. In one embodiment, the sequence of operations shown in FIG. 3 may be implemented by the internal combustion engine start/stop and idle control system 100 illustrated in FIG. 1 and detailed above, such as for implementing automatic engine shutdown, for example. In a further embodiment directed to an application to an internal combustion engine powered vehicle, the sequence of operations shown in FIG. 3 may be implemented by the internal combustion engine start/stop and idle control system 200 illustrated in FIG. 2 and detailed above.

The first operation 310 of FIG. 3 comprises verifying that the engine is running normally, and the start/stop and idle control system is switched on by a user. In one such embodiment, a PLC such as PLC 110, 210 may verify that the internal combustion engine is running normally such as by verifying one or more operation parameters of the engine are within a predetermined range and provide an indication to a user (such as a driver or equipment operator) of the normal running status of the engine, so that the user may switch on the system such as by operating a switch or key, for example. In another embodiment, the user may determine that the engine is running normally such as by confirming visible, audible or instrument parameters before switching the start/stop and idle control system on such as by manipulating a switch or key or the like.

The second operation 312 of FIG. 3 comprises checking the engine speed and optionally also checking one or more other sensors such as safety interlocks, hood sensors, tampering sensors, or other sensors, and determining whether the system is ready to engage start/stop idle control of the engine operation. In one such embodiment, the PLC 110, 210 may determine the engine speed measured by the engine speed sensor 140, 240, to check whether the engine speed is within a predetermined range, such as a predetermined normal idle speed range, for example. In another embodiment, the PLC 110, 210 may check whether other optional sensors have been triggered, such as to confirm one or more safety interlocks such as access panel or door sensors to confirm no unauthorized access or tampering has affected the system, or no maintenance access to the vehicle hood or other access areas is taking place or has affected the system. Upon checking the engine speed and optionally also one or more other sensors such as safety sensors or interlocks has taken place, a decision on readiness of the system to engage start/stop and idle control of the engine is made. In one embodiment, if the system is not in readiness to engage start/stop and idle control of the engine, the operations proceed to operation 310 and operations 310 and 312 are repeated, such as after a user reset or upon remedy of any unsuitable conditions such as open access sensors or the like. In one such embodiment, a "not ready" indication may be provided by the system to the user, such as a blinking red light or other suitable indication to reflect that the system is not ready to engage start/stop control.

In another embodiment, if the system is ready to engage start/stop and idle control of the engine, the sequence of operations proceeds to the third operation 314. Operation 314 of FIG. 3 comprises the engine ignition key being switched to the OFF position by a user to initiate start/stop and idle control of the internal combustion engine by the start/stop and idle control system 100, 200. In one such embodiment, the system 100, 200 may provide a suitable indication to the use (such as a driver or operator) that the start/stop and idle control system 100, 200 has been engaged.

The next operation 316 of FIG. 3 is checking values reported by the engine block temperature, ambient temperature and battery system voltage sensors. In one such embodiment, the PLC 110, 210 determines the engine block temperature reported by the engine block temperature sensor 120, 220, the ambient air temperature from the ambient air temperature sensor 130, 230, and the battery system voltage from connection with the engine battery system 165, 265. In a particular embodiment, the engine block temperature sensor may be particularly adapted for direct attachment to an external surface of the engine block such as by connection to a bolt or other fastener in the engine block, so as to provide for simple retrofit attachment to an existing internal combustion engine. In another embodiment, operation 316 may optionally also comprise checking one or more other sensors, such as an air start pressure reservoir used to provide pressurized air for an air powered starter in certain large internal combustion engines, such as air-started diesel engines, for example. In other embodiments, operation 316 may additional comprise checking other sensors or engine system parameters which may be relevant to controlling start/stop features of the system 100, 200.

The next operation 318 of FIG. 3 is to determine if all monitored conditions exceed predetermined threshold values for proceeding with engine shutdown. In one embodiment, the PLC 110, 210 determines whether a particular monitored condition (such as engine block temperature, ambient air temperature, engine battery voltage, air pressure, or other exemplary monitored engine conditions) exceeds a predetermined minimum threshold value for proceeding with engine shutdown. In one such embodiment, the PLC 110, 210 may be programmed with one or more desired predetermined threshold engine parameter values which are determined to represent appropriate levels for allowing automatic shutdown of the engine by the system 100, 200. For example, in one embodiment, an engine block temperature minimum threshold value to allow engine shutdown may be programmed in the PLC 110, 210 as 70 degrees C. Accordingly, in such an embodiment, the PLC 110, 210 may determine whether the engine block temperature reported by the engine block temperature sensor 140, 240 exceeds the minimum threshold of 70 degrees C. to allow automatic engine shutdown by the system 100, 200. Accordingly, if all monitored conditions are determined to exceed the applicable minimum threshold values for shutdown, then the sequence of operations proceeds to operation 322 described below.

Conversely, if one or more of the monitored conditions do not exceed the applicable predetermined minimum threshold value for engine shutdown, the sequence of operations proceeds to operation 320 in which the engine is kept running and shutdown does not proceed. In one embodiment, according to operation 320, the engine may be kept running for a predetermined additional period of time before proceeding back to operation 316 to re-check the monitored condition values reported by at least the engine block temperature sensor 120, 220, ambient air temperature sensor 130, 230, and the engine battery voltage 165, 265. In another embodiment, after operation 320 in which the engine is kept running, the sequence of operations may proceed directly back to operation 316 to check the applicable sensors and thereafter to operation 318 to assess the sufficiency of the monitored conditions in relation to shutdown, thereby providing for substantially continuous monitoring of the monitored conditions until they all exceed the applicable predetermined minimum threshold value for shutdown.

The next operation 322 in the sequence illustrated in FIG. 3 comprises initiation of engine shutdown and checking of the monitored engine conditions in connection with an engine startup sequence which begins with operation 410 of FIG. 4, described further below. In one such embodiment, the PLC 110, 210 initiates automatic shutdown of the internal combustion engine at operation 322, such as by deactivating the ignition switch and/or ignition connection 170 to the engine ECU, or alternatively by means of other suitable known methods for automatic engine shutdown, for example.

In a particular embodiment, the sequence of operations illustrated in FIG. 3 may be pre-programmed on a PLC 110, 210, such as stored in a non-volatile memory of the PLC 110, 210, for execution by the PLC upon retrofit installation to an existing internal combustion engine, for example. In one embodiment, the sequence of operations may be varied or adjusted within the PLC 110, 210 in the field after installation on an existing vehicle and/or internal combustion engine powered equipment, such as by a suitably authorized technician, such authorization established by password or code access, for example. In such a manner, one or more pre-programmed or predetermined operations or values may be varied or adjusted so as to permit flexible implementation of the system 100, 200 to a range of vehicles/equipment and desired operating conditions, while desirably providing the advantages of automatic start/stop and idle control functions to desirably reduce fuel consumption and wear and desirably increase efficiency and/or longevity of engine operations, for example.

Figure 4:
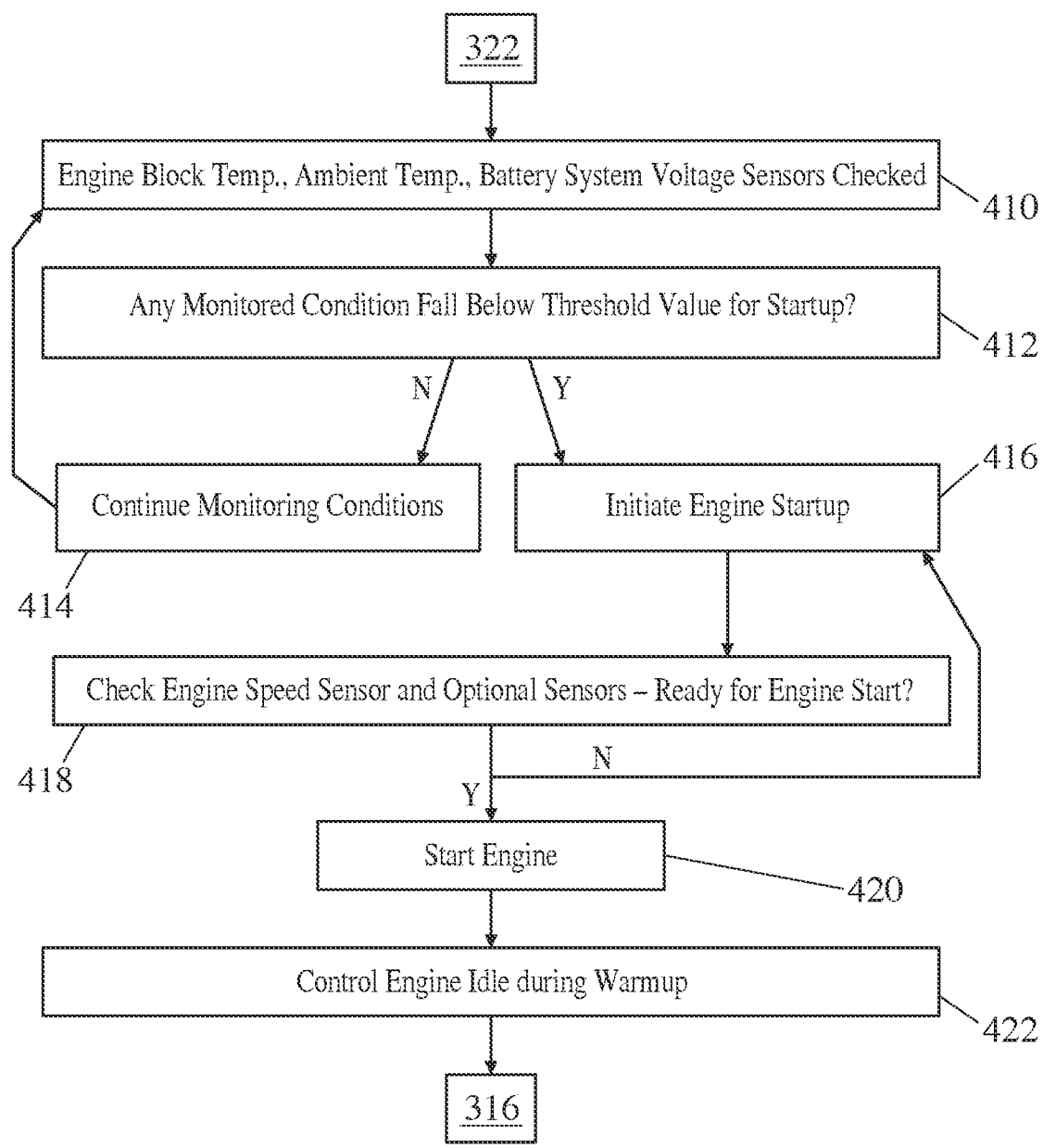
FIG. 4 illustrates a further exemplary sequence of operations associated with a method of start/stop engine control, according to a further embodiment of the present invention.

With reference to FIG. 4, an exemplary sequence of operations associated with a method of start/stop engine control is shown, according to an embodiment of the present invention. In one embodiment, the sequence of operations shown in FIG. 4 may be implemented by the internal combustion engine start/stop and idle control system 100 illustrated in FIG. 1 and detailed above, such as for implementing automatic engine startup, for example. In a further embodiment directed to an application to an internal combustion engine powered vehicle, the sequence of operations shown in FIG. 4 may be implemented by the internal combustion engine start/stop and idle control system 200 illustrated in FIG. 2 and detailed above.

The first operation 410 of FIG. 4 comprises checking values reported by the engine block temperature, ambient temperature and battery system voltage sensors. In one such embodiment, the PLC 110, 210 determines the engine block temperature reported by the engine block temperature sensor 120, 220, the ambient air temperature from the ambient air temperature sensor 130, 230, and the battery system voltage from connection with the engine battery system 165, 265. In a particular embodiment, the engine block temperature sensor may be particularly adapted for direct attachment to an external surface of the engine block such as by connection to a bolt or other fastener in the engine block, so as to provide for simple retrofit attachment to an existing internal combustion engine. In another embodiment, operation 316 may optionally also comprise checking one or more other sensors, such as an air start pressure reservoir used to provide pressurized air for an air powered starter in certain large internal combustion engines, such as air-started diesel engines, for example. In other embodiments, operation 410 may additional comprise checking other sensors or engine system parameters which may be relevant to controlling start/stop features of the system 100, 200.

The next operation 412 of FIG. 4 is to determine if any one of the monitored conditions fall below a predetermined threshold value for proceeding with, or requiring, automatic engine startup. In one embodiment, the PLC 110, 210 determines whether a particular monitored condition (such as engine block temperature, ambient air temperature, engine battery voltage, air pressure, or other exemplary monitored engine conditions) falls below a predetermined threshold value for proceeding with, or requiring engine startup. In one such embodiment, the PLC 110, 210 may be programmed with one or more desired predetermined threshold engine parameter values which are determined to represent appropriate levels for allowing or requiring automatic startup of the engine by the system 100, 200. For example, in one embodiment, a minimum engine block temperature threshold value to trigger or require engine startup may be programmed in the PLC 110, 210 as 15 degrees C., such that the engine startup would be indicated if the engine block temperature at any time fell below 15 degrees C. Accordingly, in such an embodiment, the PLC 110, 210 may determine whether the engine block temperature reported by the engine block temperature sensor 140, 240 falls below the minimum threshold of 15 degrees C. to allow or require automatic engine restart by the system 100, 200. Accordingly, if any one of the monitored conditions are determined to fall below the applicable predetermined threshold values for engine restart, then the sequence of operations proceeds to operation 416 described below. In an optional embodiment comprising an optional coolant heater (not shown), the PLC may additionally determine whether the engine block temperature falls below an additional optional threshold temperature for activation of the optional coolant heater, which may be different from the minimum engine block temperature threshold value to trigger or require engine startup, for example. In one such optional embodiment, such additional optional threshold temperature for activation of an optional coolant heater may be predetermined to be at a higher block temperature than the minimum engine block temperature threshold value to trigger or require engine startup, for example.

Conversely, if all of the monitored conditions remain above the applicable predetermined minimum threshold value allowing or requiring engine startup, then the sequence of operations proceeds to operation 414 in which monitoring of the engine conditions (including at least engine block temperature, ambient air temperature and engine battery voltage, and optionally also any additional desired engine parameters such as air pressure for air start, for example) is continued and startup of the engine does not proceed.

In one embodiment, following operation 414, in which monitoring of the engine parameters continues, the sequence of operations may proceed back to operation 410 to re-check the monitored condition values reported by at least the engine block temperature sensor 120, 220, ambient air temperature sensor 130, 230, and the engine battery voltage 165, 265. In a particular embodiment, after operation 414, the sequence may proceed back to operation 410 substantially immediately to recheck the applicable sensors and thereafter to operation 412 to assess the sufficiency of the monitored conditions in relation to engine startup, thereby providing for substantially continuous monitoring of the monitored conditions until at least one of the monitored conditions falls below the applicable predetermined minimum threshold value for allowing or requiring engine restart.

In the case where any one of the monitored conditions are determined to fall below the applicable predetermined threshold values for engine restart, then at operation 416 engine startup is initiated.

The next operation 418 of FIG. 4 follows operation 416, and operation 418 comprises checking the engine speed sensor and optionally also checking one or more other sensors such as safety interlocks, hood sensors, tampering sensors, or other sensors, and determining whether the system 100, 200 is ready to restart the engine. In one such embodiment, the PLC 110, 210 may determine the engine speed measured by the engine speed sensor 140, 240, to check that the engine is not operating before engaging the starter for restart. In another embodiment, the PLC 110, 210 may check whether other optional sensors have been triggered, such as to confirm one or more safety interlocks such as access panel or door sensors to confirm no unauthorized access or tampering has affected the system, or no maintenance access to the vehicle hood or other access areas is taking place or has affected the system. Upon checking the engine speed and optionally also one or more other sensors such as safety sensors or interlocks has taken place, a decision on readiness of the system to engage the starter and restart the engine is made. In one embodiment, if the system is not in readiness to restart the engine, the operations proceeds back to operation 416 and operations 416 and 418 are repeated, such as after a user reset or upon remedy of any unsuitable conditions such as open access sensors or the like.

In another embodiment, if the system is ready to engage the starter and restart the engine, the sequence of operations proceeds to the next operation 420. Operation 420 of FIG. 4 comprises engaging the starter and restarting the engine. In one such embodiment, the PLC 110, 210 initiates automatic restart of the internal combustion engine at operation 420, such as by activating the ignition switch and/or ignition connection 170 to the engine ECU, and by activating an engine start contact on the ignition switch or otherwise engaging the starter to crank the engine for restart, or alternatively by means of other suitable known methods for automatic engine startup, for example. In a further embodiment, the startup procedure for restarting the engine may comprise optional control for one or more subsequent starting attempts if a first attempt at restarting fails, and may also optionally include an abort or lockout feature to prevent further starting attempts and to optionally notify a user or operator if necessary due to an error with the engine systems during restart, for example. In yet another embodiment related to application in engines requiring or including a pre-lube function, a pre-lube pump may be energized for a predetermined period prior to engaging the starter to provide for pre-lubrication of the engine prior to restarting, for example.

The next operation 422 of FIG. 4 comprises controlling engine idle speed during warmup of the engine following starting. In one embodiment, after the engine has started, a normal or default idle speed may be maintained for a predetermined period of time, followed by an optional increase or ramp in idle speed to a fast idle condition at a predetermined desired fast idle speed, such as to provide for improved warmup of the engine and system, or to reduce potential low idle related problems such as low engine/exhaust temperatures, fouling, "wet stacking", condensation or other potential idle issues. During operation 422, engine idle speed may be monitored by PLC 110, 210 such as by determining the engine idle speed measured by the engine speed sensor 140, 240, and by adjusting engine idle speed such as by control of a fast idle switch 150, 250, or the like to desirably provide a predetermined engine idle speed profile during engine warmup. Following the completion of operation 422, the sequence of operations illustrated in FIG. 4 may continue to operation 316 as described above in reference to FIG. 3, comprising checking values reported by the engine block temperature, ambient temperature and battery system voltage sensors. In one such embodiment, the PLC 110, 210 may monitor engine idle operation for a predetermined period of time during a run or warmup cycle of engine operation, such as before proceeding to determine whether to shut down the engine in accordance with the operations shown in FIG. 3 following operation 316. In another embodiment, upon completion of restarting of the engine, the PLC 110, 210 may proceed with operations 316 and subsequently 318 to determine whether predetermined conditions exist for shutdown of the engine in a subsequent start/stop cycle, as described above in accordance with the operations of FIG. 3.

In a particular embodiment, the sequence of operations illustrated in FIG. 4 may be pre-programmed on a PLC 110, 210, such as stored in a non-volatile memory of the PLC 110, 210, for execution by the PLC upon retrofit installation to an existing internal combustion engine, for example. In one embodiment, the sequence of operations may be varied or adjusted within the PLC 110, 210 in the field after installation on an existing vehicle and/or internal combustion engine powered equipment, such as by a suitably authorized technician, such authorization established by password or code access, for example. In such a manner, one or more pre-programmed or predetermined operations or values may be varied or adjusted so as to permit flexible implementation of the system 100, 200 to a range of vehicles/equipment and desired operating conditions, while desirably providing the advantages of automatic start/stop and idle control functions to desirably reduce fuel consumption and wear and desirably increase efficiency and/or longevity of engine operations, for example.

Figure 5:
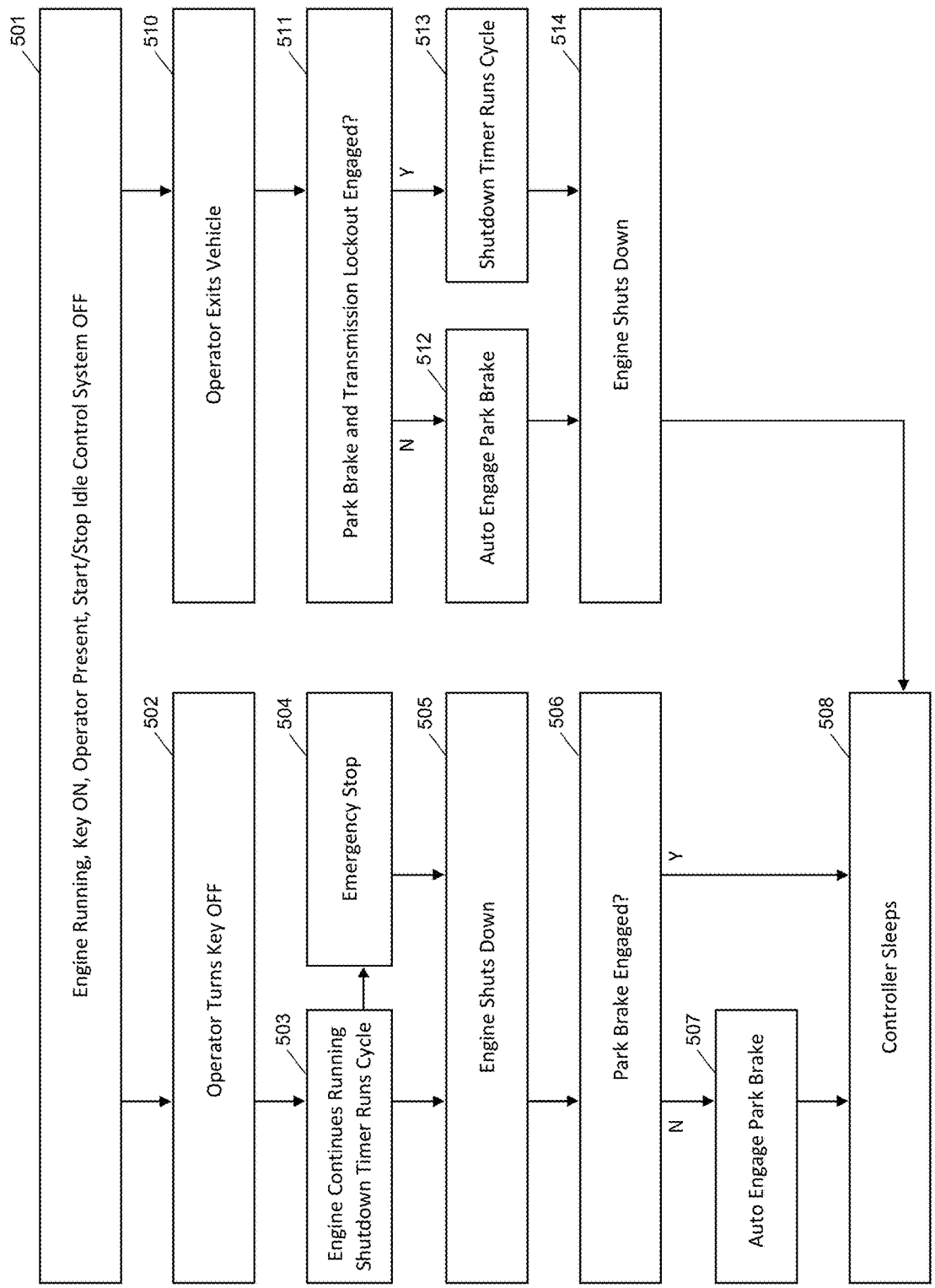
FIG. 5 illustrates a process flow chart of an exemplary process of the present disclosure.

FIG. 5 is a process flow chart of an exemplary process of the present disclosure. The process begins at block 501 when the system detects that the engine is running, the key is on, an operator is present, and the retrofit engine start/stop control system is initially off. At block 502, the operator of the vehicle turns the key off to switch off the engine. At block 503, the retrofit engine start/stop control system keeps the engine running as a shut-down timer runs its cycle. For example, the shut-down timer may user a period of time before shutting down the engine to allow a turbocharger to cool. This period may be set by the owner of the engine, such as based on properties of the engine, the climate, or other conditions of the engine as determined by the engine sensors. During this timer cycle, at block 504, a user of the engine or a remote user may activate an emergency stop button or other control. The emergency stop may immediately end the timer and shut down the engine, which may be useful for situations where it would be unsafe or otherwise undesirable to continue running the engine during the shutdown timer.

At block 505, the engine shuts down either because of the shutdown timer finishing its cycle or as the result of a user activating an emergency stop feature of the retrofit engine start/stop control system. At block 506, the retrofit engine start/stop control system checks if a parking brake of the engine/vehicle is activated. At block 507, if the park brake is not activated, the retrofit engine start/stop control system may be configured to engage the parking brake as a safety feature. At block 508, having shut down the engine and ensure the parking brake is activated, the controller of the retrofit engine start/stop control system enters a sleep mode.

The process flow chart also illustrates a second possible process flow for the retrofit engine start/stop control system. Again, at block 501, the process begins as the system detects that the engine is running, the key is on, an operator is present, and the retrofit engine start/stop control system is initially off. Here, at block 510, the retrofit engine start/stop control system detects that an operator exits the vehicle. This detection may be done using an operator sensor such as, e.g., a sensor which senses the weight placed on an operator's seat or a seat belt detected for the operator's seatbelt. At block 511, the retrofit engine start/stop control system determines whether a parking brake and a transmission lockout are engaged, using appropriate sensors to detect both pieces of information. At block 512, if the parking brake has not been engaged, the system is configured to engage the parking brake. At block 513, if the parking brake has been engaged, the retrofit engine start/stop control system initiates and runs a shutdown timer, which can allow the engine to continue running to, e.g., give time to cool a turbocharger or other parts of the engine. The process of block 513, while not illustrated, may also be run after the system engages the parking brake if the parking brake was not engaged by the operator of the engine. At block 514, the retrofit engine start/stop control system shuts the engine down, after the shutdown timer has concluded. As with block 504, an emergency stop option may also be available to an operator of the engine. After the engine has shut down, at block 508, the controller may enter a sleep mode to conserve power.

Figure 6:
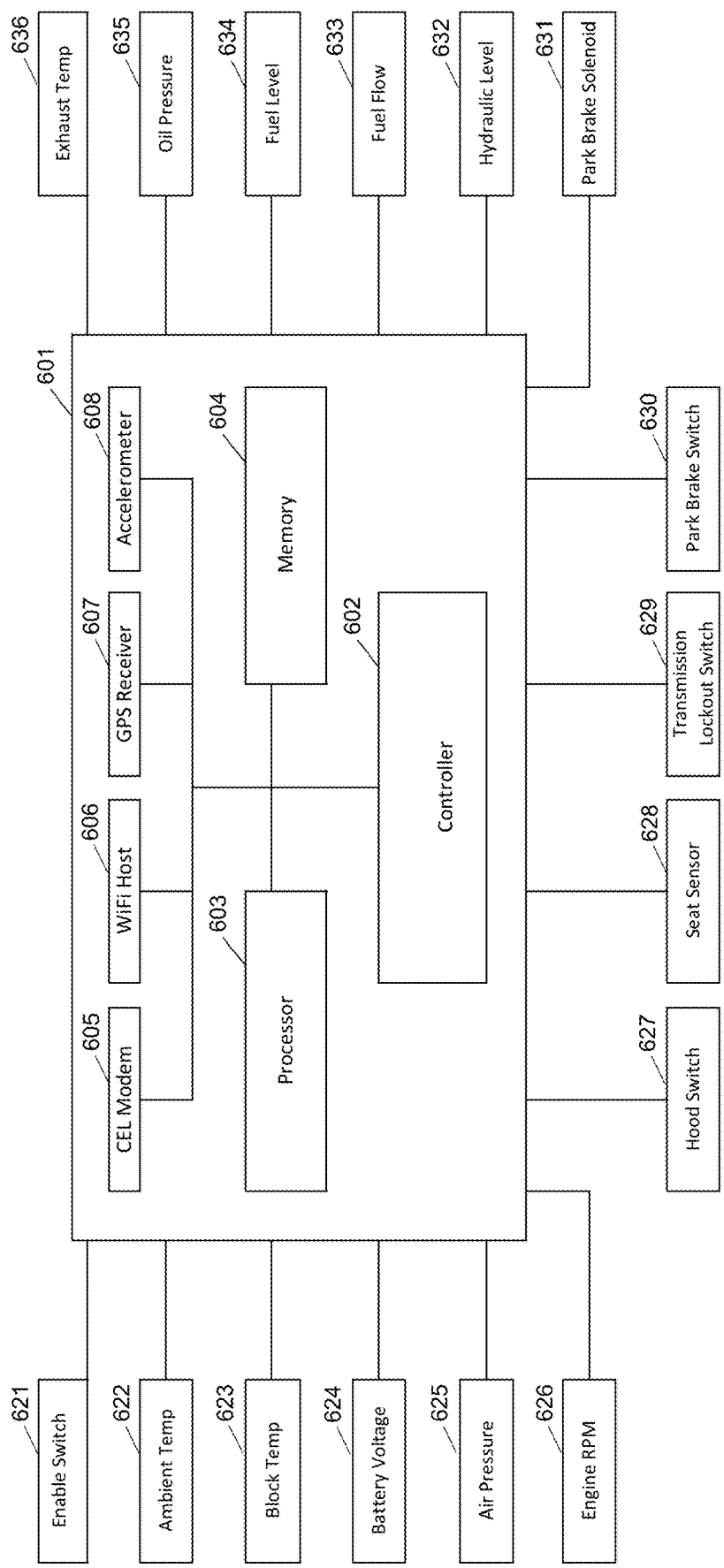
FIG. 6 illustrates a schematic diagram of a retrofit engine start/stop and idle control system according to one aspect of the present disclosure.

FIG. 6 illustrates a schematic diagram of a retrofit engine start/stop and idle control system according to one aspect of the present disclosure. Many elements herein may be optional in some implementations of the retrofit engine start/stop system. The control module 601 may contain several interconnected components configured to work with one another, including a controller 602, a processor 603, and memory 604. The control module 601 may further include one or more communication components, which allow it to connect to external networks, potentially allowing for connections with remote users, such a cellular modem 605 and/or Wi-Fi host 606. The control module 601 may further include a GPS receiver 607 and an accelerometer 608.

In addition to its own internal components, communication devices, and sensors, the control module 601 may also be operably attached to many sensors placed in and around an engine and a vehicle including the engine. The retrofit engine start/stop system further includes an enable switch 621 which is operably connected to the control module 601. The retrofit engine start/stop system also includes an ambient temperature sensor 622, an engine block temperature sensor 623, a battery voltage sensor 624, an air pressure sensor 625, and an engine RPM sensor 626. Each of these components may be operably connected to the control module 601. The retrofit engine start/stop system further includes other sensors, including a hood switch sensor 627, an operator sensor such as a seat sensor 628, a transmission lockout switch 629, a parking brake switch 630, a parking brake solenoid 631, a hydraulic level sensor 632, a fuel flow sensor 633, a fuel level sensor 634, an oil pressure sensor 635, and an exhaust temperature sensor 636. Each of these components is operably connected to the control module 601 in this exemplary embodiment.

In one aspect, a programmable logic controller may make be used for some or all of the control module 601. In one aspect, this PLC and/or the control module 601 may be operably connected to an exhaust gas temperature sensor 636. The PLC and/or the control module 601 may use this sensor to monitor the temperature of the exhaust gas, including elevated levels of exhaust gas temperature caused by periodic regeneration functions essential to operation of Tier 4 diesel engines. During these regeneration cycles, the PLC and/or the control module 601 may be configured to override any shutdown triggers to ensure that the engine remains running until the exhaust temperature drops below an appropriate temperature, signaling completion of the regeneration process.

In one aspect of the present disclosure, a retrofit engine start/stop control system for an air starter equipped internal combustion engine is disclosed. The system includes an ignition circuit connector operable to energize an air control valve to use compressed gas from a compressed gas tank to initiate starting of the engine, an air pressure sensor to measure a pressure of the compressed gas tank available to initiate starting of the engine via an air starter, an engine block temperature sensor operable to directly measure an external temperature of the engine, an ambient air temperature sensor operable to measure the ambient air temperature outside an engine compartment containing the engine, a battery voltage sensor operable to measure the output voltage of an alternator and/or starter battery for the engine, an engine speed sensor operable to measure a rotational speed (RPM) of the engine, and a programmable logic controller configured to control stop and start functions of the engine, the programmable logic controller configured to energize the ignition circuit to initiate starting of the engine when at least one the pressure of the compressed gas tank, the external temperature of the engine, the ambient air temperature, and the output voltage fall below a predefined threshold value.

For example, the ignition circuit connector may include a Y-harness which plugs into the OEM male and female ignition key connectors to enable control of the retrofit engine start/stop control system. The system can quickly be isolated and returned to strictly OEM by simply removing this Y-harness and reconnecting the male and female OEM connectors. In one aspect, the predefined threshold values may be, e.g., 100 PSI for the compressed gas tank, 25 degrees Celsius for the engine temperature, −5 degrees Celsius for the ambient temperature, and 23.5 volts for the output voltage. Other threshold values may also be used based on the particular specification of a given engine, and these settings may be adjusted by an owner and/or an operator of the system. For example, these values may be adjusted by an operator, including allowing an operator to adjust these settings remotely.

In the system, the compressed gas tank may be a compressed air tank. The system may also include a parking brake engagement sensor configured to sense an engagement of a parking brake associated with the engine. The programmable logic controller may be configured to immediately stop the engine based upon the parking brake engagement sensor sensing that the parking brake is not engaged while an operator sensor simultaneously senses that an operator has left a cab of a vehicle. The programmable logic controller may be further configured to stop the engine after an interval based upon the parking brake engagement sensor sensing that the parking brake is engaged while an operator sensor simultaneously senses that an operator has left a cab of a vehicle. The programmable logic controller may be further configured to delay a shut-down of the engine based on a cool-down time a turbocharger associated with the engine.

The system may be further configured to allow a remote user to monitor live data from the engine including from one of more of the ambient air temperature, the external temperature of the engine, the rotational speed of the engine, the pressure of the compressed gas tank, and the output voltage. The system may be further configured to allow a remote user to control an operation of the system including one of more of turning on or off the system, turning off the engine, and modifying the predefined threshold value to adjust an operation of the system.

The programmable logic controller may be further configured to initiate shutdown of the engine when at least one of the pressure of the compressed gas tank, the external engine block temperature, the ambient temperature, and the battery output voltage rise above a predefined threshold value for shutdown. The system may further include a removable data storage medium operable to record system status information, including one or more of the pressure of the compressed gas tank, the external temperature of the engine, the ambient air temperature, the battery output voltage, and the rotational speed of the engine. The data storage medium may be one or more of an internal or removable memory card, chip, or suitable storage memory.

The programmable logic controller may be operably connected to a fast idle switch for providing control of an idle rate or idle engine speed during operation of the system. The fast idle switch may be operably connected to a fast idle throttle position sensor for detecting a throttle position of the engine during fast idle. The engine block temperature sensor may be adapted for attachment to an outside of the engine. The system may also include a coolant heater communicably connected to the programmable logic controller to provide initial heating or preheating of the internal combustion engine.

The system may further include an exhaust gas temperature sensor operable to measure a temperature of exhaust gases from the engine. The PLC may be further configured to monitor elevated levels of the temperature of the exhaust gases due to periodic regeneration functions of the engine, and is configured to override triggers to shut down the engine during these periodic regeneration functions.

In one aspect, a method for retrofit engine start/stop idle control is described. The method includes determining if air starter equipped internal combustion engine is running, measuring an air pressure of a compressed gas tank available to initiate starting of the air starter equipped internal combustion engine via an air starter, determining if the measured air pressure is below a threshold value, and, if the air starter equipped internal combustion engine is not running, initiating startup of the air starter equipped internal combustion engine using the compressed gas tank. The method may also include controlling engine idle during warmup of the air starter equipped internal combustion engine. The compressed gas tank may be a compressed air tank.

While the present invention and its various functional components and operational functions have been described in particular exemplary embodiments, the invention may also be implemented in hardware, software, firmware, middleware or a combination thereof and utilized in systems, subsystems, components or subcomponents thereof. In particular embodiments implemented in software, elements of the present invention may be instructions and/or code segments to perform the necessary tasks. The program or code segments may be stored in a machine readable medium, such as a processor readable, such as a processor readable medium or a computer program product, or transmitted by a computer data signal embodied in a carrier wave, or a signal modulated by a carrier, over a transmission medium or communication link. The machine readable medium or processor readable medium may include any medium that can store or transfer information in a form readable and executable by a machine, for example a processor, computer, etc.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: ROM and RAM devices including Flash RAM memory storage cards, sticks and chips, magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices including Flash RAM memory storage cards, sticks and chips, for example. Examples of computer code include machine code, such as produced by a compiler, and files containing higher-level code that are executed by a computer using an interpreter. For example, an embodiment of the invention may be implemented using any suitable scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. A retrofit engine start/stop control system for an air starter equipped internal combustion engine, the system comprising:

an ignition circuit connector operable to energize an air control valve to use compressed gas from a compressed gas tank to initiate starting of the engine;

an air pressure sensor to measure a pressure of the compressed gas tank available to initiate starting of the engine via an air starter;

an engine block temperature sensor operable to directly measure an external temperature of the engine;

an ambient air temperature sensor operable to measure the ambient air temperature outside an engine compartment containing the engine;

a battery voltage sensor operable to measure the output voltage of an alternator and/or starter battery for the engine;

an engine speed sensor operable to measure a rotational speed (RPM) of the engine;

a programmable logic controller configured to control stop and start functions of the engine, the programmable logic controller configured to energize the ignition circuit to initiate starting of the engine when at least one the pressure of the compressed gas tank, the external temperature of the engine, the ambient air temperature, and the output voltage fall below a predefined threshold value; and a parking brake engagement sensor configured to sense an engagement of a parking brake associated with the engine;

wherein the programmable logic controller is further configured to immediately stop the engine based upon the parking brake engagement sensor sensing that the parking brake is not engaged while an operator sensor simultaneously senses that an operator has left a cab of a vehicle.

2. The retrofit engine start/stop control system of claim 1, wherein the compressed gas tank comprises a compressed air tank.

3. The retrofit engine start/stop control system of claim 1, wherein the programmable logic controller is further configured to delay a shut-down of the engine based on a cool down time of a turbocharger associated with the engine.

4. The retrofit engine start/stop control system of claim 1, wherein the system is further configured to allow a remote user to monitor live data from the engine including from one of more of the ambient air temperature, the external temperature of the engine, the rotational speed of the engine, the pressure of the compressed gas tank, and the output voltage.

5. The retrofit engine start/stop control system of claim 1, wherein the system is further configured to allow a remote user to control an operation of the system including one of more of turning on or off the system, turning off the engine, and modifying the predefined threshold value to adjust an operation of the system.

6. The retrofit engine start/stop control system of claim 1, wherein the programmable logic controller is further configured to initiate shutdown of the engine when at least one of the pressure of the compressed gas tank, the external engine block temperature, the ambient temperature, and the battery output voltage exceed a predefined threshold value for shutdown.

7. The retrofit engine start/stop control system of claim 1, further comprising a removable data storage medium operable to record system status information, including one or more of the pressure of the compressed gas tank, the external temperature of the engine, the ambient air temperature, the battery output voltage, and the rotational speed of the engine.

8. The retrofit engine start/stop control system of claim 7, wherein the data storage medium comprises one or more of an internal or removable memory card, chip, or suitable storage memory.

9. The retrofit engine start/stop control system of claim 1, wherein the programmable logic controller is operably connected to a fast idle switch for providing control of an idle rate or idle engine speed during operation of the system.

10. The retrofit engine start/stop control system of claim 9, wherein the fast idle switch is operably connected to a fast idle throttle position sensor for detecting a throttle position of the engine during fast idle.

11. The retrofit engine start/stop control system of claim 1, wherein the engine block temperature sensor is adapted for attachment to an outside of the engine.

12. The retrofit engine start/stop control system of claim 1, further comprising a coolant heater communicably connected to the programmable logic controller to provide initial heating or preheating of the engine.

13. The retrofit engine start/stop control system of claim 1, further comprising an exhaust gas temperature sensor operable to measure a temperature of exhaust gases from the engine.

14. The retrofit engine start/stop control system of claim 13, wherein the programmable logic controller is further configured to monitor elevated levels of the temperature of the exhaust gases due to periodic regeneration functions of the engine, and is configured to override triggers to shut down the engine during these periodic regeneration functions.

15. A retrofit engine start/stop control system for an air starter equipped internal combustion engine, the system comprising:

an ignition circuit connector operable to energize an air control valve to use compressed gas from a compressed gas tank to initiate starting of the engine;

an air pressure sensor to measure a pressure of the compressed gas tank available to initiate starting of the engine via an air starter;

an engine block temperature sensor operable to directly measure an external temperature of the engine;

an ambient air temperature sensor operable to measure the ambient air temperature outside an engine compartment containing the engine;

a battery voltage sensor operable to measure the output voltage of an alternator and/or starter battery for the engine;

an engine speed sensor operable to measure a rotational speed (RPM) of the engine;

a programmable logic controller configured to control stop and start functions of the engine, the programmable logic controller configured to energize the ignition circuit to initiate starting of the engine when at least one the pressure of the compressed gas tank, the external temperature of the engine, the ambient air temperature, and the output voltage fall below a predefined threshold value; and a parking brake engagement sensor configured to sense an engagement of a parking brake associated with the engine;

wherein the programmable logic controller is further configured to stop the engine after an interval based upon the parking brake engagement sensor sensing that the parking brake is engaged while an operator sensor simultaneously senses that an operator has left a cab of a vehicle.

16. The retrofit engine start/stop control system of claim 15, wherein the programmable logic controller is further configured to delay a shut-down of the engine based on a cool-down time of a turbocharger associated with the engine.

* * * * *